M. C. SCHWAB.
VEHICLE WHEEL.
APPLICATION FILED APR. 19, 1910.

1,005,891.

Patented Oct. 17, 1911.

Witnesses:
R. A. White
H. R. L. White

Inventor:
Martin C Schwab,
By Bree Bain May
Atty's

UNITED STATES PATENT OFFICE.

MARTIN C. SCHWAB, OF CHICAGO, ILLINOIS.

VEHICLE-WHEEL.

1,005,891.  Specification of Letters Patent.  Patented Oct. 17, 1911.

Application filed April 19, 1910. Serial No. 556,409.

*To all whom it may concern:*

Be it known that I, MARTIN C. SCHWAB, a citizen of the United States, residing at Chicago, in the county of Cook and State of Illinois, have invented certain new and useful Improvements in Vehicle-Wheels, of which the following is a specification.

My invention relates to improvements in vehicle wheels and has especial reference to that class of resilient wheels wherein the resilient element is removed some distance from the surface over which the wheel passes.

One of the objects of my invention is to provide a wheel which will have all of the advantages of the ordinary wheel provided with a pneumatic tire, and in which a great many of the disadvantages are not present.

Another object of my invention is to provide a resilient wheel, of the character described, wherein the tractive effect of the wheel is increased by an irregular tractive surface which I provide in the illustrative embodiment by a series of rubber balls which are held in a rigid peripheral cage surrounding the ordinary pneumatic tire, with the balls in contact against the outer surface of the tire, and presented for contact with the roadway, to engage the latter as teeth on a wheel, and thereby prevent the rotary slip of the wheel.

Other and further objects of my invention will become readily apparent to persons skilled in the art from a consideration of the following description, taken in conjunction with the drawings, wherein—

Figure 1:
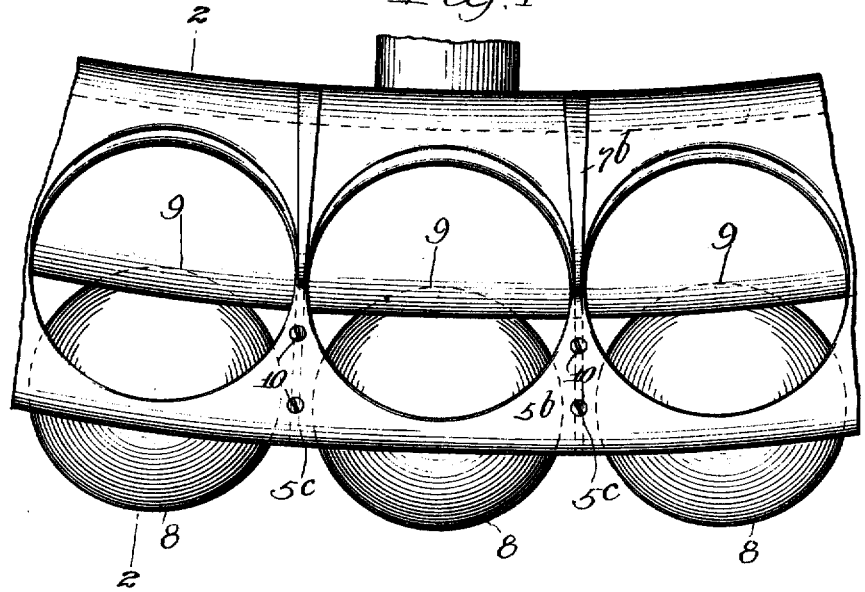
Figure 2:
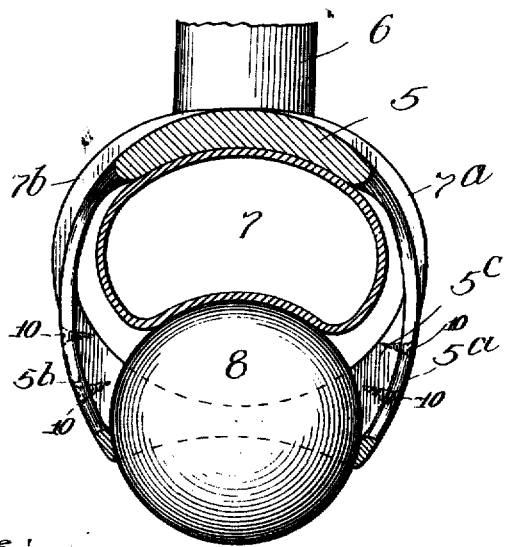

Figure 1 is a side elevation of a fragmentary portion of the wheel; and Fig. 2 is a section taken on line 2—2 of Fig. 1.

In both of the views, similar reference characters indicate similar parts.

In the embodiment shown, 5 is the rim of the wheel connected to the spokes, 6, in the usual manner. Against the rim the pneumatic tire, 7, has circumferential contact. In this respect, my wheel differs only slightly from wheels of this general character. The rim 5, extends radially beyond the pneumatic tire, 7, as indicated at $5^a$ and $5^b$, forming a circumferential chamber between the limits of the parts $5^a$ and $5^b$, for containing the pneumatic tire, and the bearing balls. The extensions, $5^a$ and $5^b$, are each joined at intervals by a bridge, $5^c$. These bridges $5^c$ divide the rim circumferentially into a series of pockets in which are placed balls, 8, preferably of rubber. Each of the pockets, within the rim, for the reception of the balls is provided on either side with circular apertures, 9, sufficiently large to admit the ball into the respective pockets. These apertures, 9, extend from bridge to bridge on the sides $5^a$ and $5^b$. The parts, $5^a$ and $5^b$, approach each other at their radial extremities so that their separation is less than the maximum diameter of the ball; so that when the ball is inserted into either of the pockets, it is prevented from passing through the circular apertures in the peripheral wall between the parts $5^a$ and $5^b$, but is free, however, to move radially inwardly against the resilient tire, 7, when in contact with the roadway. Ribs, $7^a$ and $7^b$, are placed at intervals around the tire, preferably between the apertures, 9, for the purpose of strengthening the sides of the extended rim parts, $5^a$ and $5^b$. The bridges $5^c$ which divide the circumferential space within the rim extension, $5^a$ and $5^b$, into pockets to contain balls, 8, are preferably removable and secured to the parts $5^a$ and $5^b$ in any convenient manner as by screws 10, so that the tire may be placed within the rim.

The use and operation of my device is as follows: The rim, 5, with its extensions, $5^a$ and $5^b$, preferably forming a unitary structure, is placed upon the wheel of the vehicle and secured in the usual manner. The inflated tire 7 is then placed within the space included between the extensions, $5^a$ and $5^b$. The balls 8 are in turn passed through the apertures, 9, into their positions shown in Fig. 1. The tire is then inflated, and thereby the balls are firmly held in their outermost radial position in Fig. 2, and are capable of being impressed inwardly against the pneumatic pressure exerted by the tire 7. It will be apparent that a ball upon being pressed in against the inflated tire by contact with the roadbed, forms in the tire an indentation the entire surface of which engages the ball surface. This frictional engagement between the two curved rubber surfaces acts to restrain the ball from being rotated in its pocket, as the frictional coefficients of two contacting rubber surfaces are so great as to amount to practically a fixed relation.

In the event of damage to an inflated ball, if the latter be used, it may be quickly and easily replaced by the insertion of a new ball through the aperature 9 in place of the defective one. In the ordinary use of the apparatus, the ball will be sufficiently retained in place, as shown in the drawing, and cannot under ordinary use, be disturbed or moved from their relative pockets, and are yieldingly movable within the containing cage.

In my improved structure, the tire is removed from direct contact with the roadway, and is not subject to the extensive wear and danger of puncture attendant upon contact therewith. The resilience of the tire, however, is available through the instrumentality of the balls, the pressure on the balls 8 tending to hold them outward in the circumferential rim case, so that each of the balls is resiliently yielding as a result of the pneumatic pressure effected by the tire against the balls.

Another advantage residing in my construction is the fact that the uneven circumferential surface of the wheel, between the balls, increases the tractive effect of the wheel on muddy, snowy roadways, rendering traction chains, placed across the tire, unnecessary, and therefore avoiding the noise and wear of such chain devices.

What I claim is:

1. In a vehicle wheel providing a concaved rim and an inflatable tire in circumferential contact therewith, extensions, 5ª—5ᵇ, integral with said rim at regular intervals along each edge of the rim, said extensions being of shape to provide therebetween regularly spaced circular perforations and meeting over said rim to form a circumferential chamber between the limits of said extensions, the portions of said extensions structure overlying the said rim having circular perforations at intervals corresponding to the side perforations and of less diameter than said side perforations, bridge members, 5ᶜ, secured between opposing extension members, 5ª—5ᵇ, of shape to overlie the inflated tire, said bridges dividing said circumferential ball-receiving chamber into pockets arranged at regular intervals corresponding to the perforations in said extension structure, and balls each of diameter permitting insertion thereof through the side perforations, whereby each ball is positively maintained in its respective pocket, but is free to move radially therein when in contact with the roadway.

2. In a vehicle wheel providing a concaved rim and an inflatable tire in circumferential contact therewith, extensions, 5ª—5ᵇ, integral with said rim at regular intervals along each edge of the rim, said extensions being of shape to provide therebetween regularly spaced circular perforations meeting over said rim to form a circumferential chamber between the limits of said extensions, balls for insertion into said chamber through said perforations to move freely therein when the tire is exhausted, the portion of said extension structure overlying said rim being circularly perforated at intervals corresponding to the side perforations and of less diameter than said side perforations for engagement with said balls when pressed thereinto by inflation of said tire, bridges, 5ᶜ, secured between opposing extension members, 5ª—5ᵇ, for dividing said circumferential ball-receiving chamber into pockets arranged at regular intervals corresponding to the perforations in said extension structure, said bridges being of shape to prevent balls from moving around said rim but to permit movement radially thereof, and strengthening ribs, 7ª and 7ᵇ, upon the outside of said extension members, 5ª—5ᵇ, contacting with said extension members at points left unstrengthened by inside contact with said bridges, as and for the purposes described.

In testimony whereof I hereunto set my hand in the presence of two witnesses.

MARTIN C. SCHWAB.

In the presence of—
MARY F. ALLEN,
W. LINN ALLEN.

---

Copies of this patent may be obtained for five cents each, by addressing the "Commissioner of Patents, Washington, D. C."